US008693064B2

(12) United States Patent
Brewington

(10) Patent No.: US 8,693,064 B2
(45) Date of Patent: Apr. 8, 2014

(54) PROCESS AND APPARATUS FOR RE-USABLE MEDIA BY IMAGE REMOVAL

(75) Inventor: Grace T. Brewington, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 367 days.

(21) Appl. No.: 13/092,182

(22) Filed: Apr. 22, 2011

(65) Prior Publication Data

US 2012/0268799 A1 Oct. 25, 2012

(51) Int. Cl.
*H04N 1/40* (2006.01)

(52) U.S. Cl.
USPC .......................................... 358/448; 358/1.9

(58) Field of Classification Search
USPC ................. 358/448, 1.18, 452, 453; 235/375
See application file for complete search history.

(56) References Cited

U.S. PATENT DOCUMENTS

2004/0080787 A1* 4/2004 Kakikawa et al. ........... 358/1.18
2008/0156863 A1* 7/2008 Abrott .......................... 235/375

FOREIGN PATENT DOCUMENTS

JP 04153079 5/1992
WO 9500343 1/1995

OTHER PUBLICATIONS

Leal-Ayala, D. R. at al., "Paper Re-Use: Toner-Print Removal by Laser Ablation," International Conference on Digital Printing Technologies and Digital Fabrication. Sep. 2010. 4 Pages.

* cited by examiner

*Primary Examiner* — Mark Zimmerman
*Assistant Examiner* — Michael Burleson
(74) *Attorney, Agent, or Firm* — MH2 Technology Law Group LLP

(57) ABSTRACT

Various embodiments provide methods and apparatuses for removing a printed image and/or image portion(s) of a printed image from at least one side of a media by one or more optical ablations such that the media can be ready for reuse.

11 Claims, 5 Drawing Sheets

PROCESS AND APPARATUS FOR RE-USABLE MEDIA BY IMAGE REMOVAL

BACKGROUND

Paper media bearing permanent ink are non-reusable and are often discarded after being read. Conventional methods for dealing with used non-reusable paper media include disposing of them into a landfill. Because the quantity of discarded paper media is enormous, this disposal raises significant cost and environmental issues.

Conventional methods for dealing with used non-reusable paper media also include recycling to save energy for paper manufacturing. However, the paper recycling process requires additional costs for materials and equipment. For example, the used non-reusable paper media need to be transported to a central facility for processing and, after the recycling process, the recycled paper media need to be packaged for delivery to the end user. In some cases, re-processing fails since batches of the non-reusable paper media can include unacceptable papers or inks that are non-recyclable.

An additional problem with used non-reusable paper media involves security issues of sensitive information printed on the used non-reusable paper, especially in government or military operations, because these non-reusable paper are accessible in wastebaskets, recycling bins, burn bins, or even shredders.

It is therefore desirable to locally remove sensitive information from the used non-usable paper prior to any further treatments. It is also desirable to provide methods and apparatuses for removing printed information from the paper media or other media. It is further desirable to re-use the paper media or other media instead of disposing or recycling them.

SUMMARY

According to various embodiments, the present teachings include a method for removing a printed image. To remove the printed image, a media having a printed image thereon can be scanned to map a plurality of image pixel locations of the printed image as a set of electronic image data, from which a set of scan line image data can be produced. According to the set of scan line image data, one or more optical ablations can be conducted on the plurality of image pixel locations on the media to remove the printed image from the media.

According to various embodiments, the present teachings also include a print removal apparatus that includes a scanning device and an image removal station. The scanning device can be configured to map a printed image on a pixel basis as a set of electronic image data, wherein the printed image is on at least one side of a media. The image removal station can include an optical controller and one or more optical sources. The optical controller can be configured to convert the set of electronic image data into a set of scan line image data and to control an optical ablation selectively on the printed image based on the set of scan line image data. The one or more optical sources can be configured to provide the optical ablation.

According to various embodiments, the present teachings further include a method for removing a printed image by firstly detecting a plurality of image pixel locations of the printed image on at least one side of a media through a scanning device to provide a set of electronic image data. An area editing controller can be used to select one or more image portions from the printed image to modify the set of electronic image data provided by the scanning device, the modified set of electronic image data corresponding to a plurality of selected image pixel locations of the one or more image portions. Based on the modified set of electronic image data, a set of scan line image data can be produced by an optical controller. According to the set of scan line image data, an optical ablation can be switched on to illuminate the plurality of selected image pixel locations and remove the one or more image portions of the printed image from the media.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Various embodiments provide methods and apparatuses for removing a printed image and/or image portion(s) of the printed image from at least one side of a media by one or more optical ablation(s) such that the media can be re-used or at least partially re-used. In embodiments, the removal of the printed image and/or image portion(s) can be accomplished by the exemplary optical ablation(s) with precise optical control at image pixel locations of the printed image/image portion(s) that need to be removed from the media. The image pixel locations can be detected by a scanning device that provides electronic image data to an optical controller to control the optical ablation(s).

Figure 1:
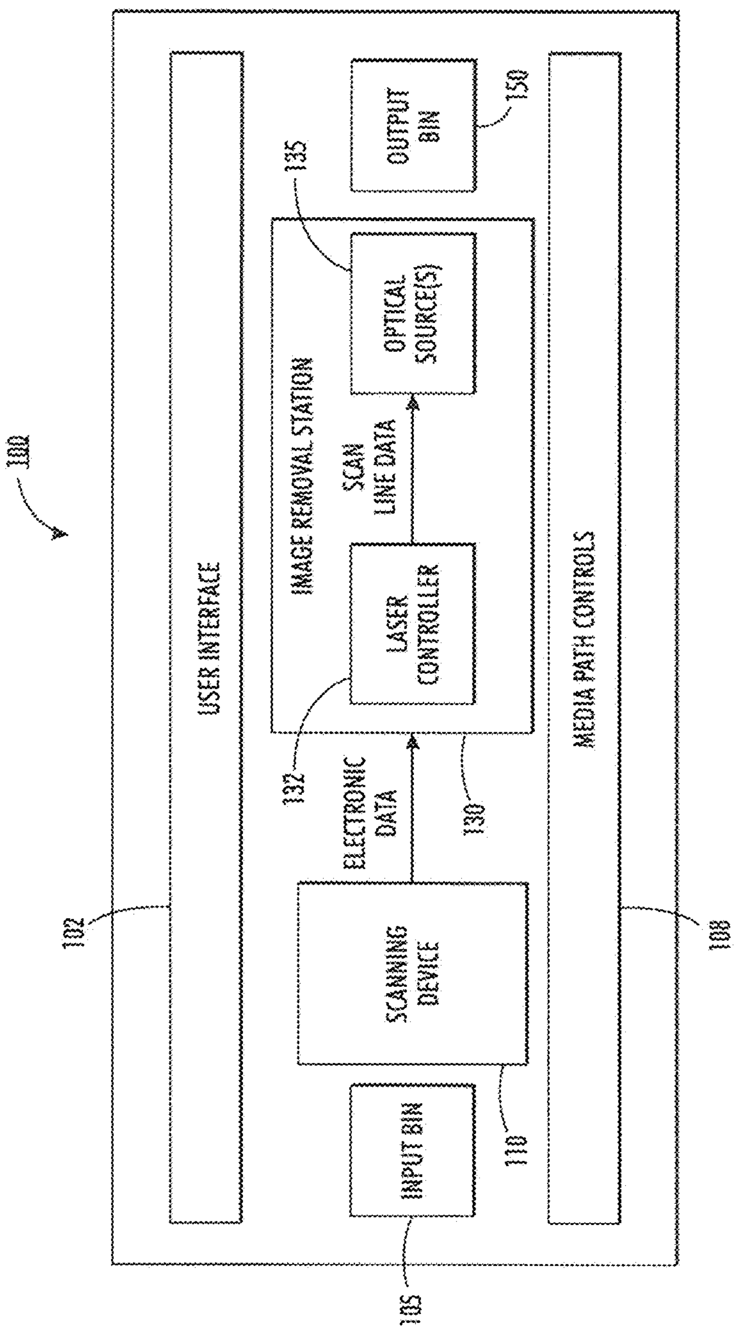
FIG. 1 depicts an exemplary method for removing a printed image from a media in accordance with various embodiments of the present teachings.

FIG. 1 depicts an exemplary method 100 for removing a printed image from a media in accordance with various embodiments of the present teachings. As shown, FIG. 1 includes a user interface 102, media path controls 108, an input bin 105, a scanning device 110, an image removal station 130, and an output bin 150.

The user interface 102 can be used to provide a printed media, e.g., including a printed image on at least one side of a media. The media can be, for example, a print substrate such as a paper sheet.

As disclosed herein, the printed image can include one or more of a toner image, an ink image, a handwritten note, a stray mark, and/or any mark that is on the media. The printed image on the media can be monochrome or include various colors. In embodiments, each of one or more sides of the media can include a printed media, which can then be processed or removed simultaneously or sequentially from the media. In embodiments, image portions selected from the printed image on each of the one or more sides of the media can be processed or removed simultaneously or sequentially from the media.

The media path controls 108 can provide a physical path of the printed media, i.e., the media having printed image(s) thereon. For example, the printed media can be loaded in the input bin 105, passed through the scanning device 110 and through the image removal station 130, and then received (e.g., stacked) in the output bin 150.

The scanning device 110 can be used to map a printed image on a media, e.g., on a pixel basis. That is, precise location of each image pixel that forms the printed image can be detected by optically scanning the printed media. The scanning device 110 can then produce a set of electronic image data dictating the image pixel locations of the printed image and pass this information, e.g., in a form of electronic image data per sheet, to the image removal station 130.

In embodiments, the generated electronic image data can include CMYK (cyan, magenta, yellow, black) and/or RGB (red, green, and blue) information. For example, the scanning device 110 can produce a monochrome electronic image data described in gray levels, and/or can produce multiple channels of electronic image data in gray levels for CMYK inks. In embodiments for handwritten notes or stray marks on the media from pen or pencil, the scanning device 110 can also detect these marks and include them in the electronic image data.

In embodiments, the set of electronic image data can be input over the network, e.g., by USB connection, wireless communication, etc, bypassing the need for the scanning device 110. This can be useful when a stack of forms is to be processed, where each image of the stack is the same.

The image removal station 130 in FIG. 1 can include, for example, an optical controller 132 and one or more optical sources 135 to provide one or more optical ablation(s).

The optical controller 132 can use the set of electronic image data provided by the scanning device 110 or the USB connection to produce a set of scan line data and to control the optical ablation(s) conducted at the optical ablation zone within the image removal station 130. In other words, the optical controller 132 can be configured to convert the set of electronic image data into a set of scan line image data and provide a controllable on-off switching of the optical ablation (s).

The optical ablation(s) based on the set of scan line image data can remove printed image on a pixel basis by directing the optical ablation(s) on image pixel locations of the printed image, while the non-imaged area between adjacent image pixel locations are not treated by the optical ablation. Likewise, the controlled on-off switching of the optical ablation(s) can allow the optical source(s) 135, such as laser(s), to be conducted for a small percentage of the time as opposed to leaving the laser on all the time. In this manner, the energy used to remove printed images from a media can be significantly reduced. For example, a typical monochrome office document has a printed image that covers 5% of the media. In this case, the laser can be on 5% of the time while processing the entire sheet of the printed media.

The optical source(s) 135 at one or more wavelengths can be used to remove printed images, e.g., from a variety of monochrome and color prints. In one embodiment, the optical source(s) 135 can include a laser having a wavelength, of about 266 nm, 355 nm, 532 nm, 1064 nm, etc. For example, a QuikLaze 50ST2 laser manufactured by New Wave Research (Fremont, Calif.) can be used to conduct laser ablation to remove the printed images.

In embodiments, the removal of the printed image can be controlled by controlling the optical ablation(s). For example, one or more of an optical power, an optical spot size, and/or an optical spot shape of the optical ablation can be controlled. In embodiments, the optical power can be controlled in the range from about 0.1 mJoule/pulse to about 0.7 mJoule/pulse, or from about 0.2 mJoule/pulse to about 0.6 mJoule/pulse, or from about 0.3 mJoule/pulse to about 0.5 mJoule/pulse. The optical spot size in diameter can be controlled in the range from about 120 μm to about 180 μm, or from about 130 μm to about 170 μm, or from about 140 μm to about 160 μm. In embodiments, the optical spot shape can be regular or irregular. For example, the optical spot shape can include a shape of a circle, oval, and/or other suitable shape.

In embodiments, the image removal process can require ablation station registration to the printed media, which can be similar to image to paper registration in conventional electrophotographic printers. For example, the media can be registered to the image removal station by control algorithms, sensors and electromechanical adjustment of the media and/or the image removal station. For example, optical focus and optical spot size can address the ablation station registration to the printed media by having the optical spot size larger than the scanning pixel size, thus allowing some latitude in registration. In embodiments, the optical ablation can be conducted two or more times using the same set of scan line image data to optically ablate and remove the printed image from the media. The media can then be ready for re-use, e.g., in a printer or a multifunction device (MFD).

Figure 2A:
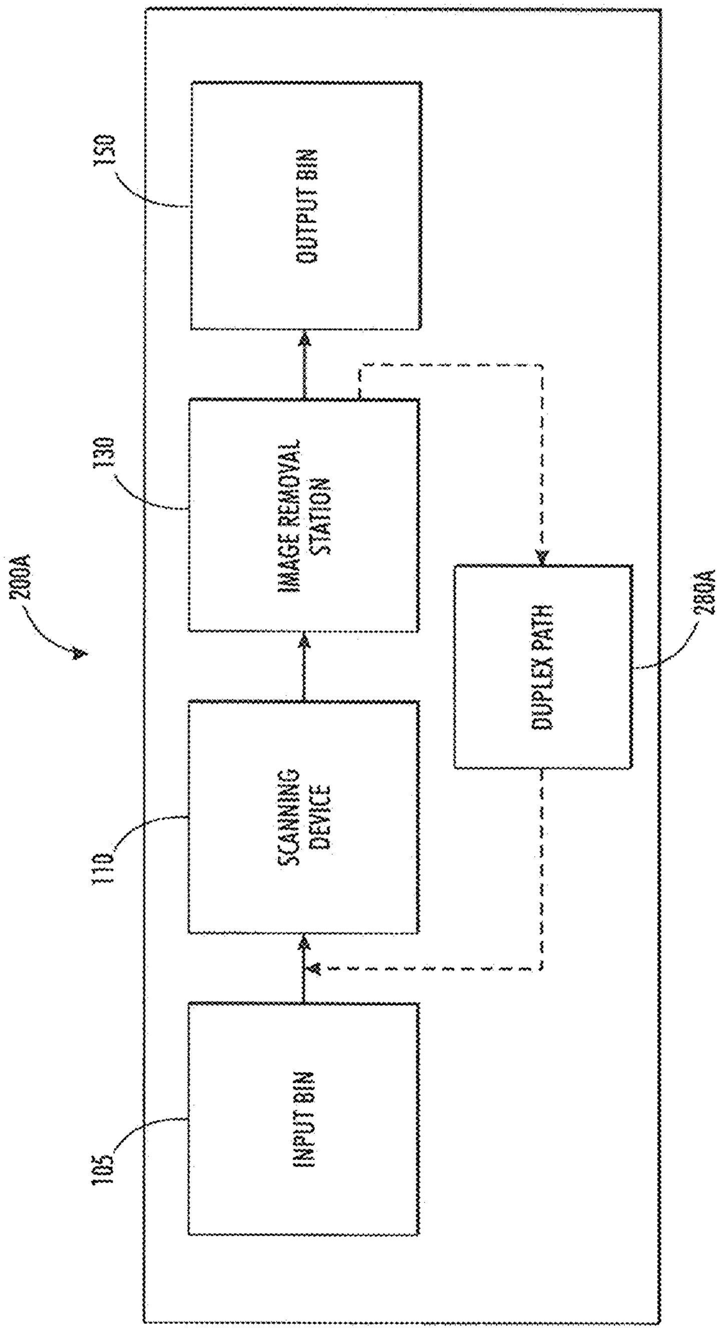
FIGS. 2A-2B depict exemplary methods for removing printed images from a media using duplex media paths in accordance with various embodiments of the present teachings.
Figure 2B:
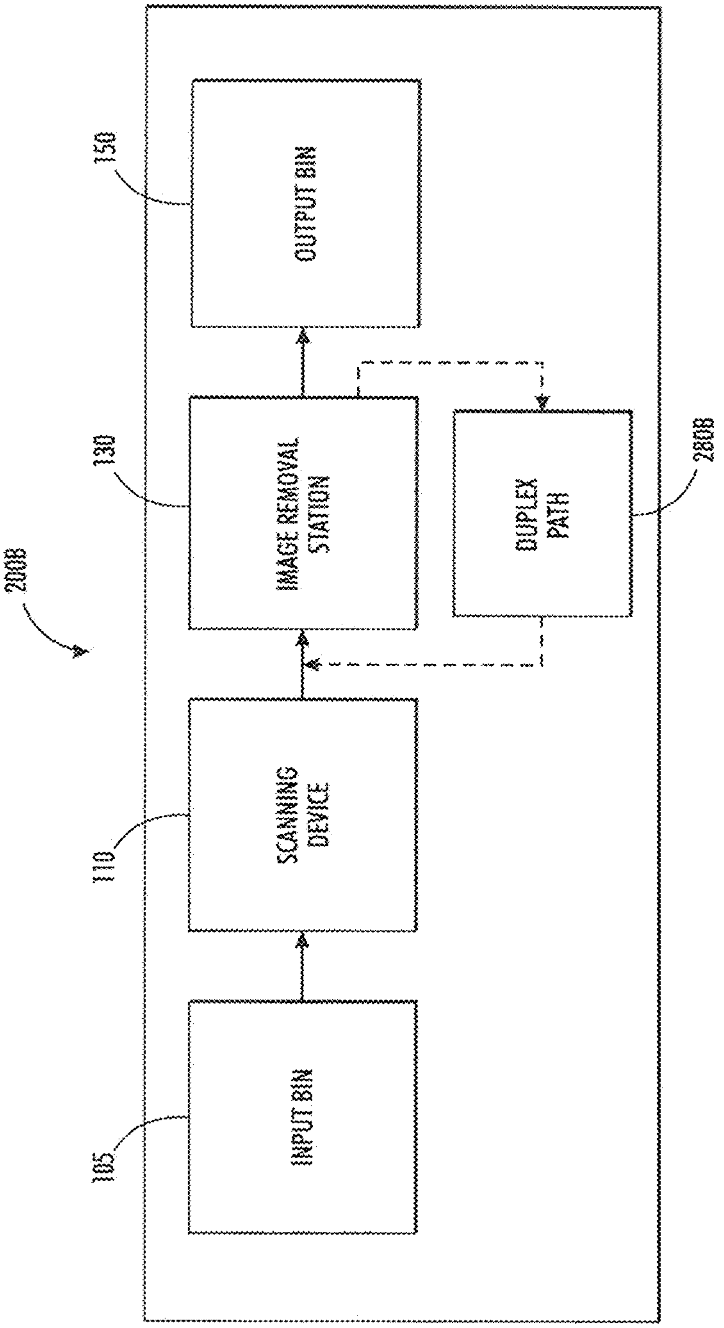

In embodiments, a duplex media path 280A or 280B, as shown in FIGS. 2A-2B, can be used for the method/apparatus depicted in FIG. 1, when two or more sides of the media have the printed images thereon.

In the example illustrated in FIG. 2A, following the removal of a first printed image on the first side of the media from the image removal station 130, as depicted in FIG. 1, the media can then be cycled back through the duplex media path 280A to the scanning device 110 to remove a second printed image on the second side of the media by repeating the method depicted in FIG. 1. For example, the second printed image on the second side of the media can be mapped on a pixel basis, to provide a second set of electronic image data corresponding to the second printed image. A second set of scan line image data corresponding to the second set of electronic image data generated by the scanning device 110 can then be produced, e.g., by an optical controller of the image removal station 130 and further be used to switch on the optical source(s) to conduct an optical ablation on the second printed image in an optical ablation zone. The second printed image can then be removed from the second side of the media, which may be passed into the output bin 150 and ready for re-using.

In the example illustrated in FIG. 2B, the scanning device 110 can scan the first side and the second side of the printed media sequentially or simultaneously in a single pass, prior to passing the printed media through the image removal station 130. Corresponding sets of electronic image data can then be generated by the scanning device 110 and corresponding sets of scan line image data based on respective set of electronic image data can then be simultaneously or sequentially generated by the optical controller 132, as similarly depicted in FIG. 1. After the first printed image is removed from the first side of the media by one or more optical ablations based on the first set of scan line image data, the media can be cycled back through the path 280B for optical ablation(s) to remove the second printed image from the second side of the media according to the second set of scan line image data.

Figure 3:
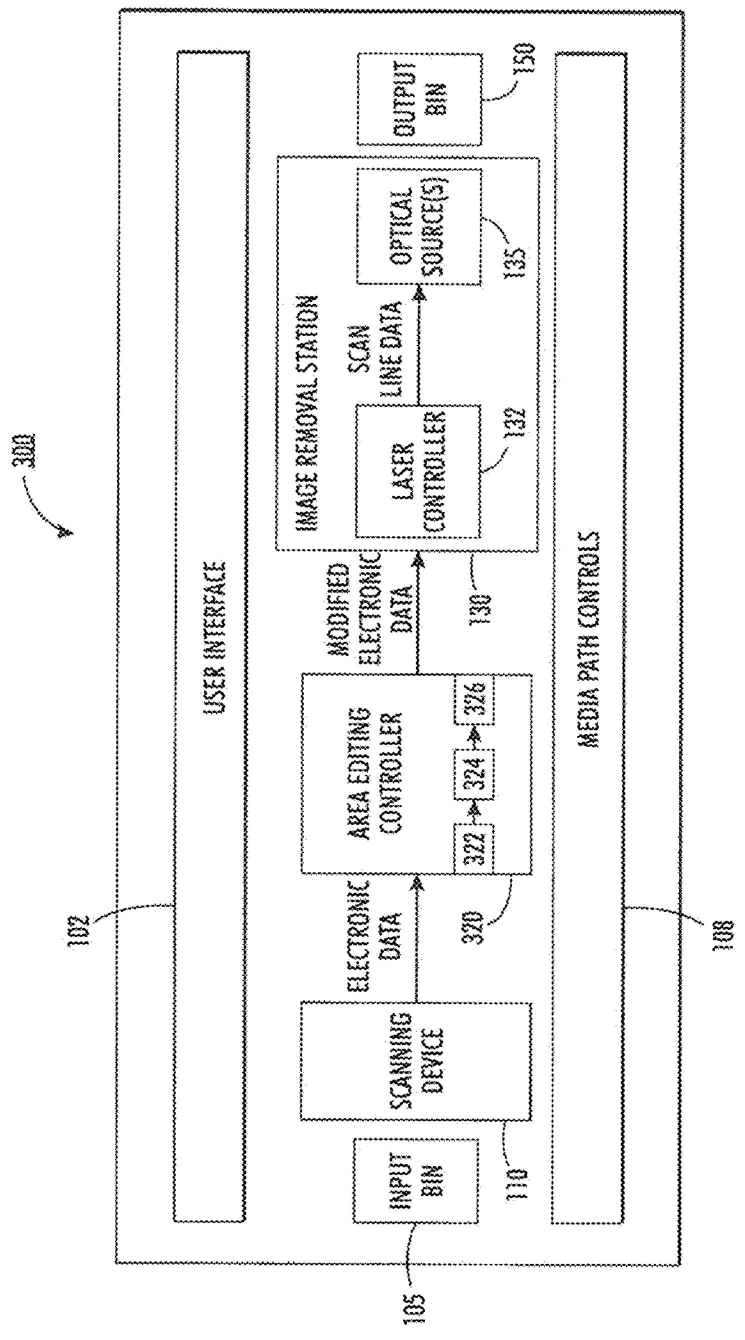
FIG. 3 depicts an exemplary method for removing selected image portion(s) of a printed image from a media in accordance with various embodiments of the present teachings.

FIG. 3 depicts an exemplary method for editing removal area in accordance with various embodiments of the present teachings. For example, one or more image portions of a printed image on each of one or more sides of a media can be edited or selected and can then be removed from the media on a pixel basis, while non-selected areas of the printed image(s) can remain on the media.

Specifically, FIG. 3 can include an area editing controller 320 that can be incorporated into the method or apparatus depicted in FIG. 1. In an exemplary removal process, a printed media, having a printed image on at least one side of the media, can be loaded into an input bin 105 and passed through a scanning device 110 to map the printed image on a pixel basis, and to provide a set of electronic image data of the entire printed image.

The area editing controller 320 can be used to select one or more image portions from the printed image on the media and to modify the set of electronic image data provided by the scanning device 110 for the entire printed image. The modified set of electronic image data can correspond to selected image pixel locations of the selected image portions. In certain embodiments, the selected image portions can be, for example, areas of only black text with no overlays of additional colors.

For example, the area editing controller 320 can include an optional user interface 322 to define an area of the selected image portion(s), an optional interface 324 to receive template information on a shape of the selected image portion(s) from an external application, and hardware/software controls 326 to merge the selected image portions with the scanned electronic image data and to communicate with the image removal station 130. Note that the image removal process will not be activated for areas or image pixels outside of the selected image portion(s).

Figure 4A:
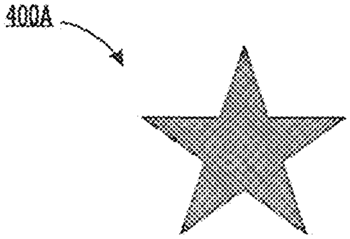
FIGS. 4A-4C depict an exemplary method for generating a reverse image in a printed image using the method depicted in FIG. 3 in accordance with various embodiments of the present teachings.
Figure 4B:
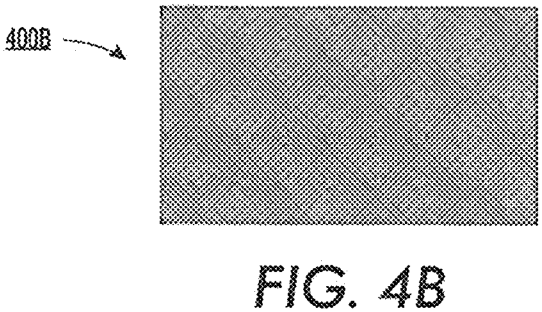
Figure 4C:
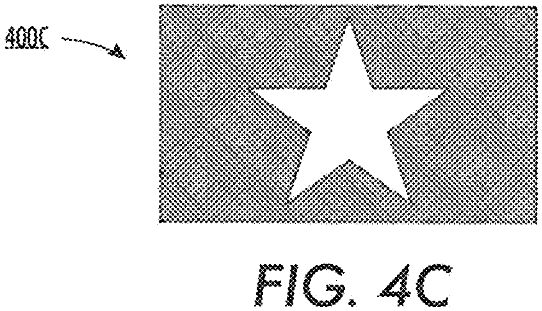

In embodiments, the selected image portion(s) can have various 2-dimensional shapes including, but not limited to, rectangle, square, oval, circle, and/or freeform, using the template by the area editing controller 320. The selected image portions on one side of the media can have same or different shapes. Various templates/shapes can be used for the selection of the image portions using the area editing controller 320. For example, FIG. 4A depicts an exemplary star image template 400A from an external input for the area editing controller 320. When this image template is incorporated with a printed image, such as a printed area 400B in FIG. 4B, the image template 400A can be used to create a reverse image on the printed area as shown in FIG. 4C.

Referring back to FIG. 3, after passing through the area editing controller 320, the printed media can then pass through the removal station 130 where the modified set of electronic image data can be converted into a set of scan line image data by an optical controller, as similarly described in FIG. 1. The optical controller can then be used to control an optical ablation on a pixel basis on the selected image portion(s) of the printed image on the media based on the set of scan line image data. By optical ablation(s) on the selected image portions of the printed image, a partially re-usable media can be obtained and/or received in the output bin 150.

In embodiments, the method depicted in FIG. 3 can also include various duplex media paths as similarly depicted in FIGS. 2A-2B in accordance with various embodiments of the present teachings.

For example, following a removal of image portion(s) of a first printed image on a first side of a media as indicated in FIG. 3, by cycling the media back to the scanning device 110 of FIG. 3 to repeat the process as for the first printed image, a second set of one or more image portions of a second printed image can be selected and removed from a second side of the media.

In another example as indicated in FIG. 2B, the method 300 for removing image portions can include, for example, simultaneously or sequentially providing a set of electronic image data for each of the first printed image and the second printed image using the scanning device 110; simultaneously or sequentially providing a first modified set of electronic image data corresponding to the first set of one or more image portions of the first printed image and a second modified set of electronic image data corresponding to the second set of one or more image portions of the second printed image by the area editing controller 320; producing a first set of scan line image data for the first set of one or more image portions of the first printed image, and a second set of scan line image data for the second set of one or more image portions of the second printed image by the optical controller 132; removing the first set of one or more image portions from the first side of the media by the optical ablation(s); cycling the media back through the optical ablation zone in the image removal station 130 to remove the second set of one or more image portions from the second printed image according to the second set of scan line image data.

In some embodiments, the apparatuses depicted in FIGS. 1, 2A-2B, and 3 can be configured in-line with a printer/MFD with automated transport of media sheets from the disclosed apparatus to the printer/MFD. In other embodiments, the apparatuses depicted in FIGS. 1, 2A-2B, and 3 can be configured near-line with a printer/MFD, with automated or manual transport of media sheets from the disclosed apparatus to the printer/MFD.

In embodiments, the apparatuses depicted in FIGS. 1, 2A-2B, and 3 can include air handling and appropriate filters for preventing effluents from escaping into the office environment.

EXAMPLES

Examples for the printed images included Ink/toner samples of Xerox WorkCentre Pro 5675 toner (conventional monochrome toner), Xerox DocuColor 250 cyan, magenta, yellow and black toner (chemical toner), and Xerox Phaser 8860MFP cyan, magenta, yellow and black ink (solid ink). Examples for the media included papers of Xerox 4200 uncoated paper and Xerox Color Xpressions Plus uncoated paper.

The laser used was a QuikLaze 50ST2 laser manufactured by New Wave Research, with output at 532 nm. Ink/toner removal was tested in a single pass under the laser at about 0.18 mJoule/pulse to about 0.54 mJoule/pulse at 15 Hz pulse frequency, 150 um/sec scan speed. Among these image samples on the paper media, the treated area for black toner/ink had a delta E of 4 to 6 to blank unmarked paper, within the error bars of the measurements, and few, if any, toner particles were visible under microscopic examination. For example, yellow toner/ink removal left some visible residual. For color toners/ink removal, cyan and magenta toner/ink removal were nearly as effective as black toner/ink removal.

For a simplex paper path, the calculated energy savings per page was at least about 85% using the disclosed method of creating re-usable paper sheets, as compared with using freshly manufactured sheets (without accounting for transportation). For a duplex paper path, the calculated energy savings per page was at least about 70% as compared with using freshly manufactured sheets (without accounting for transportation). These calculations assumed 5% conversion of wall power to laser output.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms “including,” “includes,” “having,” “has,” “with,” or variants thereof are used in either the detailed description and the claims, such terms are intended to be inclusive in a manner similar to the term “comprising.” Further, in the discussion and claims herein, the term “about” indicates that the value listed may be somewhat altered, as long as the alteration does not result in nonconformance of the process or structure to the illustrated embodiment. Finally, “exemplary” indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for removing a printed image comprising:

(a) optically scanning a media having a printed image thereon to map a plurality of image pixel locations of the printed image as a set of electronic image data;

(b) producing a set of scan line image data from the set of electronic image data;

(c) conducting one or more optical ablations on the plurality of image pixel locations on the media according to the set of scan line image data to remove the printed image from the media; and (d) controlling an optical power, an optical spot size, an optical spot shape of the one or more optical ablations to remove the printed image from the media, wherein the optical power ranges from about 0.1 mJoule/pulse to about 0.7 mJoule/pulse, a diameter of the optical spot ranges from about 120 μm to about 180 μm, or the optical spot shape comprises a circle, an oval, and a combination thereof.

2. The method of claim 1, further comprising removing the printed image that comprises one or more of a toner image, an ink image, a handwritten note, a stray mark, and combinations thereof.

3. The method of claim 1, further comprising removing the printed image that is monochrome or has a plurality of colors.

4. The method of claim 1, wherein the set of electronic image data comprises CMYK (cyan, magenta, yellow, black) information or RGB (red, green, and blue) information.

5. The method of claim 1, wherein the media comprises a first printed image on a first side of the media and a second printed image on a second side of the media, wherein a method of removing printed images from the media comprises:

removing the first printed image from the first side of the media using the steps (a) through (c);

cycling the media back for scanning according to the steps (a) through (c) to remove the second printed image from the second side of the media.

6. The method of claim 1, wherein the media comprises a first printed image on a first side of the media and a second printed image on a second side of the media, wherein a method of removing printed images from the media comprises:

optically scanning the first printed image on the first side of the media and the second printed image on the second side of the media, according to the step (a);

producing a first set of scan line image data corresponding to the first printed image and a second set of scan line image data corresponding to the second printed image, according to the step (b);

removing the first printed image from the first side of the media by the one or more optical ablations, according to the step (c); and cycling the media back for the one or more optical ablations according to the step (c) to remove the second printed image from the media based on the second set of scan line image data.

7. The method of claim 6, further comprising scanning the first printed image and the second printed image at one single pass.

8. A print removal apparatus comprising:

a scanning device configured to map a printed image on a pixel basis as a set of electronic image data, wherein the printed image is on at least one side of a media; and an image removal station comprising an optical controller and one or more optical sources, wherein the optical controller is configured to convert the set of electronic image data into a set of scan line image data and to control an optical ablation on the printed image based on the set of scan line image data, wherein the one or more optical sources are configured to provide the optical ablation, and wherein the one or more optical sources are configured to provide the optical ablation at one or more wavelengths selected from about 266, about 355 nm, about 532 nm, and about 1064 nm.

9. The apparatus of claim 8, further comprising an input bin for providing the media having the printed image on at least one side thereof to the scanning device.

10. The apparatus of claim 8, further comprising an output bin for receiving the media from the image removal station, wherein the media in the output bin is ready for re-using.

11. The apparatus of claim 8, further comprising a duplex media path to simultaneously or sequentially remove a second printed image from a second side of the media.

* * * * *